(12) United States Patent
Zimmerman

(10) Patent No.: US 11,662,246 B2
(45) Date of Patent: May 30, 2023

(54) SYSTEM AND METHOD FOR ESTIMATING IMPLEMENT LOAD WEIGHTS FOR A WORK VEHICLE WITH KNOWLEDGE OF OPERATOR-INITIATED CONTROL COMMANDS

(71) Applicant: CNH Industrial America LLC, New Holland, PA (US)

(72) Inventor: Joshua Zimmerman, Willow Springs, IL (US)

(73) Assignee: CNH Industrial America LLC, New Holland, PA (US)

( * ) Notice: Subject to any disclaimer, the term of this patent is extended or adjusted under 35 U.S.C. 154(b) by 586 days.

(21) Appl. No.: 16/490,574

(22) PCT Filed: Mar. 2, 2018

(86) PCT No.: PCT/US2018/020722
§ 371 (c)(1),
(2) Date: Sep. 2, 2019

(87) PCT Pub. No.: WO2018/161003
PCT Pub. Date: Sep. 7, 2018

(65) Prior Publication Data
US 2020/0011726 A1 Jan. 9, 2020

Related U.S. Application Data

(60) Provisional application No. 62/466,442, filed on Mar. 3, 2017.

(51) Int. Cl.
*G01G 17/00* (2006.01)
*E02F 9/26* (2006.01)
(Continued)

(52) U.S. Cl.
CPC ........... *G01G 19/083* (2013.01); *E02F 3/434* (2013.01); *E02F 9/14* (2013.01); *E02F 9/2221* (2013.01); *E02F 9/265* (2013.01)

(58) Field of Classification Search
CPC . E02F 3/434; E02F 9/2296; E02F 9/26; E02F 9/264; E02F 9/24; E02F 9/2029;
(Continued)

(56) References Cited

U.S. PATENT DOCUMENTS 3,836,010 A * 9/1974 Lampson ................ B66C 23/36
212/195
4,185,280 A * 1/1980 Wilhelm ............... B66C 23/905
702/41

(Continued)

OTHER PUBLICATIONS

PCT International Search Report for PCT application PCT/US2018/020722, dated Jun. 7, 2018 (9 pages).

*Primary Examiner* — Edwin J Toledo-Duran
(74) *Attorney, Agent, or Firm* — Peter Zacharias

(57) ABSTRACT

In several aspects, a system and associated method may be used to estimate a load weight carried by an implement of a work vehicle. In doing so, the system and method may allow for the implement load weight to be estimated by taking into account operator-initiated control commands that may impact the accuracy or reliability of the estimated weight.

20 Claims, 8 Drawing Sheets

(51) Int. Cl.
*G01G 19/08* (2006.01)
*E02F 3/43* (2006.01)
*E02F 9/14* (2006.01)
*E02F 9/22* (2006.01)

(58) Field of Classification Search
CPC . E02F 3/283; E02F 9/14; E02F 9/2221; E02F 9/265; G01G 19/12; G01G 19/08; G01G 19/083; G01G 19/10; G01G 19/14; G01G 19/23; G01G 19/18; G01G 23/01; G01G 17/00; B60R 21/01516; B60P 1/00
See application file for complete search history.

(56) References Cited

U.S. PATENT DOCUMENTS

| | | | | |
|---|---|---|---|---|
| 4,752,012 | A * | 6/1988 | Juergens | B66C 23/905 |
| | | | | 212/277 |
| 4,839,835 | A * | 6/1989 | Hagenbuch | G07C 5/008 |
| | | | | 701/1 |
| 4,919,222 | A * | 4/1990 | Kyrtsos | E02F 9/264 |
| | | | | 177/25.14 |
| 4,921,578 | A * | 5/1990 | Shiraishi | G01G 19/08 |
| | | | | 177/136 |
| 5,067,572 | A * | 11/1991 | Kyrtsos | E02F 9/264 |
| | | | | 177/25.14 |
| 5,070,953 | A * | 12/1991 | Kyrtsos | E02F 9/264 |
| | | | | 177/139 |
| 5,082,071 | A * | 1/1992 | Kyrtsos | G01G 19/083 |
| | | | | 177/139 |
| 5,105,896 | A * | 4/1992 | Kyrtsos | G01G 19/083 |
| | | | | 177/25.14 |
| 5,182,712 | A * | 1/1993 | Kyrtsos | G01G 19/10 |
| | | | | 701/1 |
| 5,780,783 | A * | 7/1998 | Heider | G01G 5/006 |
| | | | | 177/137 |
| 6,185,493 | B1 | 2/2001 | Skinner et al. | |
| 6,211,471 | B1 | 4/2001 | Rocke et al. | |
| 6,225,574 | B1 * | 5/2001 | Chang | G01G 19/08 |
| | | | | 177/139 |
| 6,518,519 | B1 * | 2/2003 | Crane, III | E02F 9/264 |
| | | | | 177/136 |
| 6,552,279 | B1 * | 4/2003 | Lueschow | G01G 19/10 |
| | | | | 73/1.13 |
| 6,601,013 | B2 * | 7/2003 | Lueschow | G01G 23/3728 |
| | | | | 702/41 |
| 6,858,809 | B2 * | 2/2005 | Bender | G01G 19/12 |
| | | | | 177/136 |
| 7,082,375 | B2 | 7/2006 | Lueschow | |
| 7,557,726 | B2 | 7/2009 | Nishimura et al. | |
| 7,627,410 | B2 * | 12/2009 | Berry | E02F 9/2029 |
| | | | | 701/1 |
| 7,881,903 | B2 * | 2/2011 | Chen | G01G 19/12 |
| | | | | 702/174 |
| 7,912,612 | B2 * | 3/2011 | Janardhan | B25J 9/1638 |
| | | | | 37/413 |
| 8,660,758 | B2 | 2/2014 | Janardhan et al. | |
| 8,666,613 | B2 * | 3/2014 | Choi | E02F 9/2058 |
| | | | | 180/336 |
| 8,788,245 | B2 * | 7/2014 | Taylor | E02F 9/264 |
| | | | | 703/2 |
| 9,938,692 | B2 * | 4/2018 | Shatters | E02F 9/264 |
| 10,597,852 | B2 * | 3/2020 | Hori | E02F 9/264 |
| 10,955,286 | B2 * | 3/2021 | Kivi | B66C 13/16 |
| 11,125,605 | B2 * | 9/2021 | Zimmerman | G01G 19/083 |
| 11,174,618 | B2 * | 11/2021 | Currier | E02F 3/434 |
| 2006/0074578 | A1 | 4/2006 | Lueschow et al. | |
| 2011/0106384 | A1 * | 5/2011 | Corke | E02F 3/48 |
| | | | | 701/50 |
| 2013/0211214 | A1 * | 8/2013 | Olsen | G16H 50/20 |
| | | | | 600/323 |
| 2014/0167971 | A1 * | 6/2014 | Stanley | G01G 19/083 |
| | | | | 340/666 |
| 2015/0275469 | A1 | 10/2015 | Fredrickson et al. | |
| 2017/0334686 | A1 * | 11/2017 | Hess | B66C 23/905 |

\* cited by examiner

SYSTEM AND METHOD FOR ESTIMATING IMPLEMENT LOAD WEIGHTS FOR A WORK VEHICLE WITH KNOWLEDGE OF OPERATOR-INITIATED CONTROL COMMANDS

FIELD OF THE INVENTION

The present subject matter relates generally to estimating the load weight carried by an implement of a work vehicle and, more particularly, to a system and method for estimating the implement load weight that take into account operator-initiated control commands to improve the reliability or accuracy of the estimated load weight.

BACKGROUND OF THE INVENTION

Work vehicles having loader arms or booms, such as wheel loaders, skid steer loaders, and the like, are a mainstay of construction work and industry. For example, wheel loaders typically include a boom pivotally coupled to the vehicle's chassis that can be raised and lowered at the operator's command. The boom typically has an implement attached to its end, thereby allowing the implement to be moved relative to the ground as the boom is raised and lowered. For example, a bucket is often coupled to the boom, which allows the wheel loader to be used to carry supplies or particulate matter, such as gravel, sand, or dirt, around a worksite or to transfer such supplies or matter to an adjacent transport vehicle (e.g., a truck or railroad car).

When using a work vehicle to perform a material moving operation, it is often desirable to have an accurate estimate of the load weight being carried by the bucket or other implement. For instance, when transferring materials to a transport vehicle, load weight estimates may be used to determine how much material has been loaded onto the transport vehicle to ensure that its load capacity is not exceeded. In this regard, several systems have been developed that attempt to estimate the load weight being carried by within a bucket. However, to date, such systems lack the accuracy and/or reliability typically desired by operators of commercial work vehicles.

Accordingly, an improved system and method for estimating the load weight carried by an implement of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for estimating load weights for an implement of a work vehicle. The method may include controlling, with one or more computing devices, movement of a boom of the work vehicle such that the boom is moved across a range of angular positions, with the implement being coupled to the boom. The method may also include receiving, with the computing device(s), load-related data associated with a load weight for the implement as the boom is moved across the range of angular positions and receiving, with the computing device(s), operator-initiated control commands associated with controlling an operation of at least one component of the work vehicle as the boom is moved across the range of angular positions. In addition, the method may include identifying, with the computing device(s), an operational period occurring as the boom is moved across the range of angular positions during which a variation in the operator-initialed control commands exceeds a variation threshold, wherein the computing device(s) receives a data subset of the load-related data during the operational period. Moreover, the method may include calculating, with the computing device(s), the load weight for the implement based on the load-related data received as the boom is moved across the range of angular positions less the data subset of the load-related data received during the operational period.

In another aspect, the present subject matter is directed to a method for estimating load weights for an implement of a work vehicle. The method may include controlling, with one or more computing devices, movement of a boom of the work vehicle such that the boom is moved across a range of angular positions, with the implement being coupled to the boom. The method may also include controlling, with the computing device(s), an operation of the boom of the work vehicle such that the movement of the boom is stopped and receiving, with the computing device(s), load-related data associated with a load weight for the implement as the boom is stationary. In addition, the method may include determining, with the computing device(s), a load correction value for the implement based on whether the previous movement of the boom corresponded to raising or lowering of the boom. Moreover, the method may include adjusting, with the computing device(s), the load-related data based on the load correction value and calculating, with the computing device(s), the load weight for the implement based on the adjusted load-related data.

In a further aspect, the present subject matter is directed to a system for estimating implement load weights for a work vehicle. The system may include a lift assembly having a boom and an implement coupled to the boom and a controller configured to control the operation of the lift assembly. The controller may include a processor and associated memory. The memory may store instructions, that when implemented by the processor, configure the controller to control movement of the boom such that the boom is moved across a range of angular positions, receive load-related data associated with a load weight for the implement as the boom is moved across the range of angular positions, and receive operator-initiated control commands associated with controlling an operation of at least one component of the work vehicle as the boom is moved across the range of angular positions. In addition, the controller may be configured to identify an operational period occurring as the boom is moved across the range of angular positions during which a variation in the operator-initiated control commands exceeds a variation threshold, wherein the controller receives a data subset of the load-related data during the operational period. Moreover, the controller may be configured to calculate the load weight for the implement based on the load-related data received as the boom is moved across the range of angular positions less the data subset of the load-related data received during the operational period.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
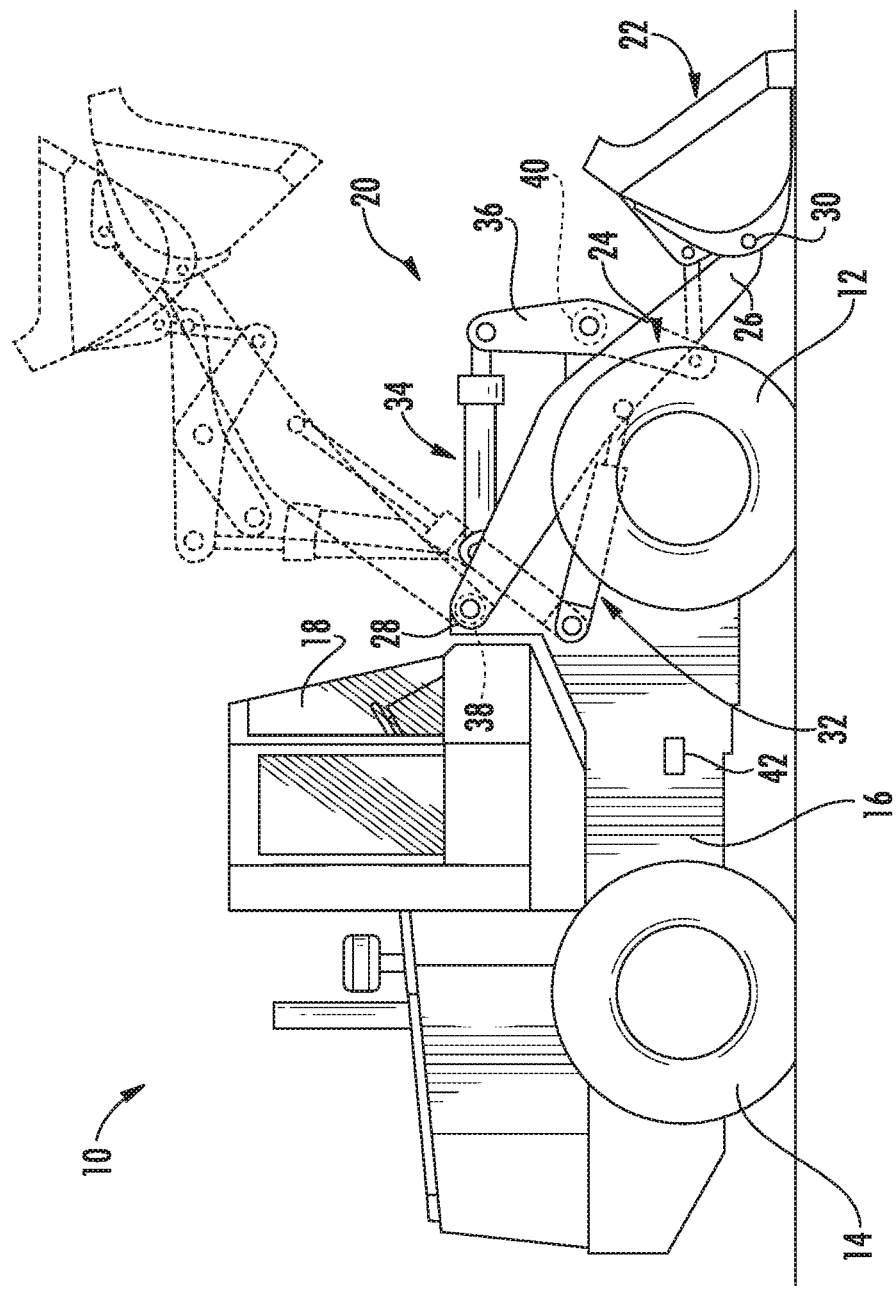
FIG. 1 illustrates a side view of one embodiment of a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for estimating a load weight carried by an implement of a work vehicle. In particular, a system and method are disclosed that allow for the implement load weight to be estimated by taking into account operator-initiated control commands that may impact the accuracy or reliability of the estimated weight. For instance, when the present subject matter is being utilized to dynamically estimate implement load weights as the vehicle's boom is being moved, the variability of operator-initiated control commands related to the boom movement, implement movement, changes in the engine speed, changes in the transmission gear ratio, and/or steering of the work vehicle may be considered to determine when the load-related data captured by the disclosed system should be used to calculate the load weight. For instance, if it is determined that the variation of one or more operator-initiated control commands exceeds a predetermined threshold(s) associated with such control command(s) across a given operational period (e.g., a given time period or a given range of boom movement), the load-related data captured during such operational period may be discarded or ignored when estimating the implement load weight. As such, the load weight may be calculated based only on data collected when it is determined that the vehicle's operation is relatively stable, thereby improving the accuracy or reliability of the weight estimations provided by the disclosed system.

Moreover, in instances in which the boom is stationary and the associated hydraulic pressures are allowed to settle, the operator-initiated control commands associated with the previous boom movement may, in several embodiments, be used to correct or adjust at least a portion of the load-related data being used to calculate the implement load weight. Specifically, given that the friction within the boom cylinders will act in one direction when lifting and in the opposed direction when lowering, the disclosed system may determine whether the previous operator-initiated control command was associated with lifting or lowering the boom. The sensed values for the hydraulic pressure forces associated with the boom cylinders may then be adjusted up or down based on such determination to improve the accuracy of the implement load weight being estimated.

Referring now to the drawings, FIG. 1 illustrates a side view of one embodiment of a work vehicle 10 in accordance with aspects of the present subject matter. As shown, the work vehicle 10 is configured as a wheel loader. However, in other embodiments, the work vehicle 10 may be configured as any other suitable work vehicle that includes a lift assembly for adjusting the position of an associated implement, such as a skid steer loader, a backhoe loader, a compact track loader and/or the like.

As shown, the work vehicle 10 includes a pair of front wheels 12, (one of which is shown), a pair of rear wheels 14 (one of which is shown) and a frame or chassis 16 coupled to and supported by the wheels 12, 14. An operator's cab 18 may be supported by a portion of the chassis 16 and may house various input devices for permitting an operator to control the operation of the work vehicle 10.

Moreover, as shown in FIG. 1, the work vehicle 10 may include a lift assembly 20 for raising and lowering a suitable implement 22 (e.g., a bucket) relative to a driving surface of the vehicle 10. In several embodiments, the lift assembly 20 may include a boom 24 (e.g., including one or more loader or boom arms) pivotally coupled between the chassis 16 and the implement 22. For example, as shown in FIG. 1, the boom 24 may include a forward end 26 and an aft end 28, with the forward end 26 being pivotally coupled to the implement 22 at a forward pivot point 30 and the aft end 28 being pivotally coupled to a portion of the chassis 16.

In addition, the lift assembly 20 may also include one or more boom cylinders 32 coupled between the chassis 16 and the boom 24 and one or more tilt cylinders 34 coupled between the chassis 16 and the implement 22 (e.g., via a pivotally mounted bellcrank 36 or other mechanical linkage). It should be readily understood by those of ordinary skill in the art that the boom and tilt cylinders 32, 34 may be utilized to allow the implement 22 to be raised/lowered and/or pivoted relative to the driving surface of the work vehicle 10. For example, the boom cylinder(s) 32 may be extended and retracted in order to pivot the boom 24 upward and downwards, respectively, thereby at least partially controlling the vertical positioning of the implement 22 relative to the driving surface. Similarly, the tilt cylinder(s) 34 may be extended and retracted in order to pivot the implement 22 relative to the boom 24 about the forward pivot point 30, thereby controlling the tilt angle or orientation of the implement 22 relative to the driving surface.

The work vehicle 10 may also include a plurality of sensors for monitoring for various operating parameters of the work vehicle 10. For instance, as shown in FIG. 1, the work vehicle 10 may include one or more position sensors 38, 40 for monitoring the position and/or orientation of the boom 24 and/or the implement 22, such as by including a first position sensor 38 provided in operative association with the boom 24 (e.g., at or adjacent to the aft end 28 of the boom 24) and a second position sensor 40 provided in operative association with the bellcrank 36 (e.g., at or adjacent to a pivot point for the bellcrank 36). The position sensors 38, 40 may also allow the movement velocity of the boom 24 and/or the implement 22 to be determined by identifying the change in position of such component(s) over time. Additionally, as shown, the work vehicle 10 may include one or more inclination sensors 42 configured to monitor the angle of inclination of the work vehicle 10, such as by including a dual-axis inclination sensor 42 mounted to the chassis 16 that is configured to monitor the angle of inclination of the work vehicle 10 in both a pitch direction (e.g., the front-to-back inclination) and a roll direction (e.g., the side-to-side inclination). Moreover, as will be described below with reference to FIG. 2, the work vehicle 10 may also include one or more pressure sensors 44, 46 (FIG. 2) for monitoring the pressure of the hydraulic fluid supplied to the boom cylinder(s) 32 and/or the tilt cylinder(s) 34 and/or one or more temperature sensors 48 (FIG. 2) for monitoring the fluid temperature of the hydraulic fluid.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration.

Figure 2:
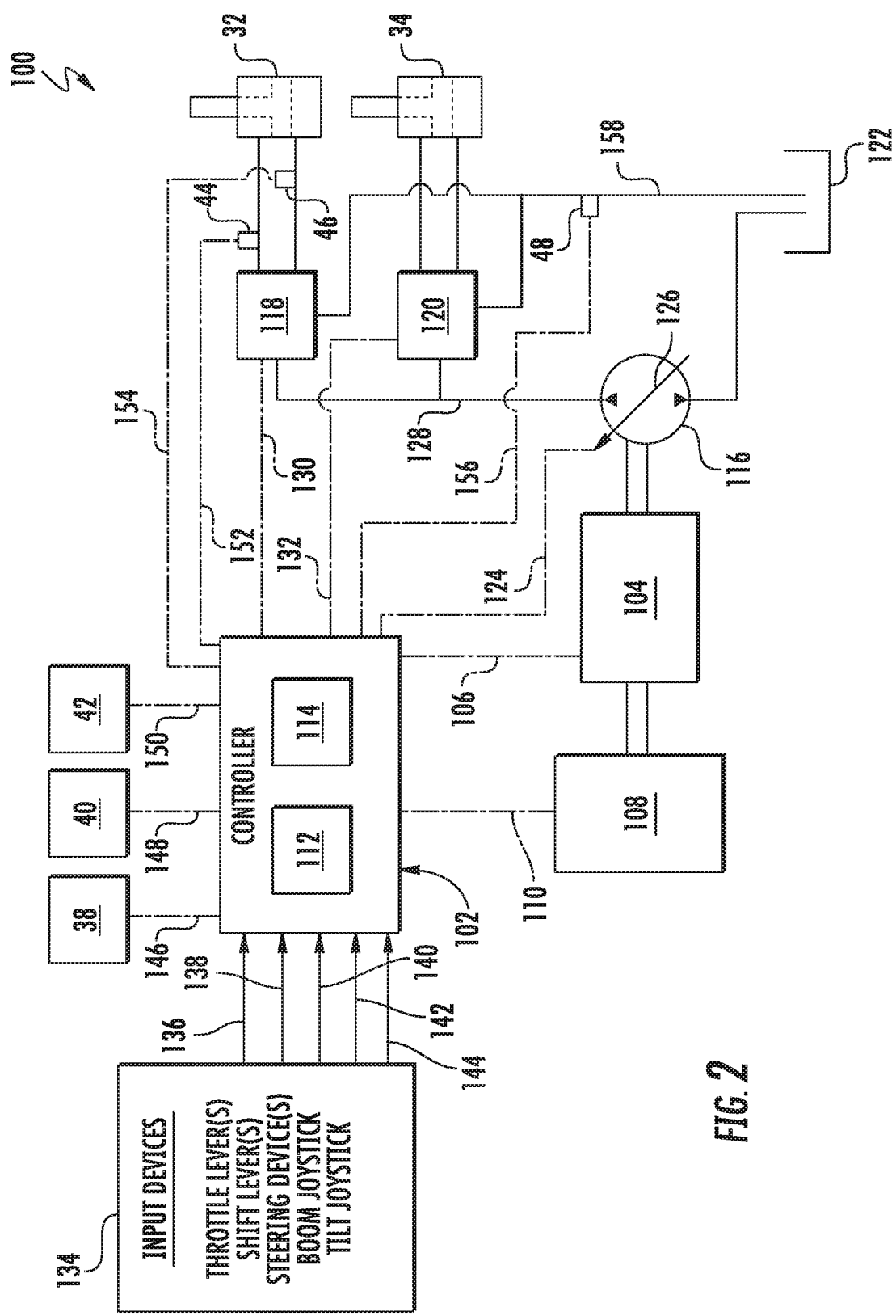
FIG. 2 illustrates a schematic view of one embodiment of a system for estimating a load weight carried by an implement of a work vehicle in accordance with aspects of the present subject matter.

Referring now to FIG. 2, a schematic, simplified view of one embodiment of a system 100 for estimating a load weight carried by an implement of a work vehicle is illustrated in accordance with aspects of the present subject matter. In general, the system 100 will be described herein with reference to the work vehicle 10 shown in FIG. 1. However, it should be appreciated that the disclosed system 100 may be utilized with any other suitable work vehicles to allow for the implement load weight to be estimated. It should be appreciated that hydraulic or fluid couplings of the system 100 shown in FIG. 2 are indicated by solid lines. Similarly, communicative links or electrical couplings of the system 100 shown in FIG. 2 are indicated by phantom lines.

As shown in FIG. 2, in several embodiments, the system 100 may include a controller 102 configured to control the operation of one or more components of the work vehicle 10, such as one or more components of the vehicle's drivetrain and/or the vehicle's lift assembly 20. For example, the controller 102 may be communicatively coupled to one or more components of an engine 104 of the work vehicle 10 (e.g., an engine governor or engine control unit (ECU) (not shown)) via one or more communicative links 106 in order to control and/or monitor the speed and/or torque output of the engine 104. Similarly, the controller 102 may be communicatively coupled to one or more components of a transmission 108 of the work vehicle 10 via one or more communicative links 110 to control the operation of the transmission 108. For instance, the controller 102 may be configured to transmit suitable control commands via communicative link 110 to one or more clutch valves (not shown) to control the engagement/disengagement of one or more clutches (not shown) of the transmission 108.

It should be appreciated the controller 102 may generally comprise any suitable processor-based device known in the art, such as one or more computing devices. Thus, in several embodiments, the controller 102 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 114 of the controller 102 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 114 may generally be configured to store suitable computer-readable instructions that, when implemented by the processor(s) 112, configure the controller 102 to perform various computer-implemented functions, such as performing the various calculations and/or algorithms described herein (including implementing the flow diagrams described below with reference to FIGS. 6 and 8). In addition, the controller 102 may also include various other suitable components, such as a communications circuit or module, one or more input/output channels, a data/control bus and/or the like.

It should also be appreciated that the controller 102 may correspond to an existing controller of the work vehicle 10 (e.g., an existing engine and/or transmission controller) or the controller 102 may correspond to a separate controller. For instance, in one embodiment, the controller 102 may form all or part of a separate plug-in module that may be installed within the work vehicle 10 to allow for the disclosed system and method to be implemented without requiring additional software to be uploaded onto existing control devices of the vehicle 10.

Moreover, the controller 102 may also be communicatively coupled to one or more components for controlling the operation of the various cylinders 32, 34 of the lift assembly 20 of the work vehicle 10. For example, in several embodiments, the controller 102 may be coupled to one or more pumps 116 and associated control valves 118, 120 for controlling the flow of hydraulic fluid from a fluid tank 122 of the work vehicle 10 to each cylinder 32, 34. Specifically, as shown in FIG. 2, the lift assembly 20 may include a hydraulic pump 116 driven via an output of the engine 104. In such an embodiment, the controller 102 may be communicatively coupled to the hydraulic pump 116 (e.g., via communicative link 124) so that the position or angle of a swash plate of the first hydraulic pump 116 (the swash plate being denoted by diagonal arrow 126 through the pump 116) may be automatically adjusted to regulate the discharge pressure of the pump 116. In one embodiment, the angle of the swash plate 126 may be adjusted via an associated actuator(s) (not shown) configured to be controlled by the controller 102.

As shown in FIG. 2, the hydraulic pump 116 may be fluidly coupled to one or more boom control valves 118 and one or more tilt control valves 120 via one or more fluid lines 128. The boom control valve(s) 118 may generally be configured to regulate the supply of hydraulic fluid to the boom cylinder(s) 32, thereby controlling the extension/ retraction of the boom cylinder(s) 32. Similarly, the tilt control valve(s) 120 may generally be configured to regulate the supply of hydraulic fluid to the tilt cylinder(s) 34, thereby controlling the extension/retraction of the tilt cylinder(s) 34. In several embodiments, the control valves 118, 120 may correspond to electrically controlled valves (e.g., solenoid-activated valves) to allow the controller 102 to automatically control the operation of each valve 118, 120. For instance, as shown in FIG. 2, the controller 102 may be communicatively coupled to the control valves 118, 120 via associated communicative links 130, 132, thereby allowing the controller 102 to regulate the extension/retraction of the associated cylinders 32, 34 via control of the valves 118, 120.

The controller 102 may also be communicatively coupled to one or more operator-controlled input devices 134 located within the vehicle's cab 18. As such, the controller 102 may be configured to receive various operator-initiated control commands for controlling the operation of the work vehicle 10. For instance, the controller 102 may be communicatively coupled to an engine throttle lever to allow the controller 102 to receive control signals associated with operator-initiated engine speed commands for adjusting the engine speed of the engine 104 (e.g., as indicated by arrow 136 in FIG. 2). In addition, the controller 102 may be communicatively coupled to a shift lever or other suitable input device configured to allow the operator to transmit control signals associated with operator-initiated shift commands for adjusting the current gear ratio of the transmission 108 (e.g., as indicated by arrow 138 in FIG. 2). Similarly, the controller 102 may be communicatively coupled to a steering sensor configured to allow the controller 102 to receive steering commands (e.g., as indicated by arrow 140 in FIG. 2) associated with adjustments in the vehicle's steering angle as the operator manipulates the steering wheel or other steering device of the work vehicle 10. Moreover, the controller 102 may be communicatively coupled to one or more joysticks for receiving control commands associated with controlling the movement of the boom 32 and/or the implement 34. For instance, the controller may be coupled to both a boom joystick for receiving operator-initiated control commands associated with controlling the movement of the boom 24 (e.g., as indicated by arrow 142 in FIG. 2) and a tilt joystick for receiving operator-initiated control commands associated with controlling the movement of the implement 22 (e.g., as indicated by arrow 144 in FIG. 2).

As indicated above, the controller 102 may also be communicatively coupled to one or more position sensors 38, 40 (e.g., via communicative links 146, 148) for monitoring the position(s) and/or orientation(s) of the boom 24 and/or the implement 22. In several embodiments, the position sensor(s) 38, 40 may correspond to one or more angle sensors (e.g., a rotary or shaft encoder(s) or any other suitable angle transducer(s)) configured to monitor the angle or orientation of the boom 24 and/or implement 22 relative to one or more reference points. For instance, in one embodiment, a first angle sensor(s) may be positioned at the rear pivot point for the boom 24 to allow the angular position of the boom 24 relative to the work vehicle 10 to be monitored. Similarly, in one embodiment, a second angle sensor(s) may be positioned at one of the pivot points for the bellcrank 36 to allow the position of the implement 22 relative to the boom 24 to be monitored. In alternative embodiments, the position sensors 38, 40 may correspond to any other suitable sensor(s) that is configured to provide a measurement signal associated with the position and/or orientation of the boom 24 and/or the implement 22. It should be appreciated that the position sensors 38, 40 may also allow the movement velocity of the boom 24 and/or the implement 22 to be determined by identifying the change in position of such component(s) over time.

Moreover, as indicated above, the controller 102 may also be communicatively coupled to one or more inclination sensors 42 (e.g., via communicative link 150) configured to monitor the angle of inclination of the work vehicle 10. For example, in several embodiments, the inclination sensor(s) 42 may comprise one or more one or more accelerometers, inclinometers, gyroscopes and/or any other suitable inclination sensor(s) configured to monitor the angle of inclination of the work vehicle 10 by measuring its orientation relative to gravity. For instance, as described above with reference to FIG. 1, the inclination sensor(s) 42 may correspond to a dual-axis sensor mounted to a portion of the chassis 16 to allow the sensor(s) 42 to monitor the angle of inclination of the work vehicle 10 in two directions (e.g., the pitch and roll directions of the work vehicle 19). However, in other embodiments, the inclination sensor(s) 42 may be disposed on the work vehicle 10 at any other suitable location.

Additionally, in several embodiments, the system 100 may also include one or more pressure sensors 44, 46 communicatively coupled to the controller 102 (e.g., via communicative links 152, 154) to allow the controller 102 to monitor the fluid pressure of the hydraulic fluid being supplied to the boom cylinder(s) 32 and/or the tilt cylinder(s) 34. For instance, as shown in FIG. 2, the controller 102 may be coupled to first and second pressure sensors 44, 46 provided in fluid communication with the fluid lines provided between the boom control valve(s) 118 and the boom cylinder(s) 32, with the first pressure sensor 44 being configured to monitor the fluid pressure of the hydraulic fluid supplied to the rod-side of the boom cylinder(s) 32 and the second pressure sensor being configured to monitor the fluid pressure of the hydraulic fluid supplied to the piston-side of the boom cylinder(s) 32. Although not shown, it should be appreciated that similar pressure sensors may also be provided in fluid communication with the fluid lines associated with the tilt cylinder(s) 34 to monitor the fluid pressure of the hydraulic fluid being supplied to such cylinder(s) 34.

Referring still to FIG. 2, the controller 102 may also be communicatively coupled to one or more temperature sensors 48 (e.g., via communicative link 156) configured to allow the temperature of the hydraulic fluid utilized within the vehicle's hydraulic system to be monitored. For instance, as shown in FIG. 2, the temperature sensor(s) 48 may, in one embodiment, be provided in operative association with a return line 158 for the hydraulic fluid to allow the fluid temperature of the hydraulic fluid being returned to the fluid tank 122 to be monitored.

It should be appreciated that the controller 102 may also be communicatively coupled to any other suitable sensors configured to monitor one or more operating parameters of the work vehicle 10 and/or its components. For instance, the controller 102 may also be communicatively coupled to a suitable sensor (not shown) that allows the controller 102 to monitored the speed and/or acceleration of the work vehicle 10.

As indicated above, the disclosed system 100 may be utilized to calculate or estimate a current load weight being carried by the vehicle's implement 22. Specifically, in several embodiments, the controller 102 may include known mathematical relationships and/or look-up tables stored within its memory 114 that correlate the vehicle's boom geometry and various relevant operating parameters (e.g., the angular position of the boom 24, the angular position of the implement 22, the velocity of the boom 24 and/or the implement 22, the angle of inclination of the work vehicle 10, the boom cylinder pressure(s), the temperature of the hydraulic fluid, and the speed and/or acceleration of the work vehicle 10) to an associated load weight of the implement 22. Thus, by continuously monitoring the relevant operating parameters using the various sensors described above (e.g., the position sensors 38, 40, the inclination sensors 42, the pressure sensors 44, 46, the temperature sensors 48, and the like), the controller 102 may calculate a current load weight for the implement 22 based on such load-related data. This estimated load weight may then be displayed to the operator of the work vehicle 10 via a suitable display device housed within the cab 18.

In several embodiments, the controller 102 may be configured to execute static measurement method in which the load weight for the implement 22 is calculated when the boom 24 are stationary. For instance, when boom 24 has stopped moving or is otherwise stationary, the controller 102 may be configured to receive sensor data from the various sensors 38, 40, 42, 44, 46, 48 related to the angular position of the boom 24 and/or the implement 22, the angle of inclination of the work vehicle 10, the boom cylinder pressure(s), and/or the temperature of the hydraulic fluid. Based on such monitored operating parameters, the controller 102 may then calculate a "static" load weight for the implement 22 using the mathematical relationships and/or look-up tables stored within its memory 114.

In addition to the "static" measurements, the controller 102 may also be configured to dynamically calculate the load weight for the implement 22 as the boom 24 is being moved across a range of angular boom positions. In such embodiments, the travel range of the boom 24 may, for example, be divided into a plurality of distinct measurement regions. By receiving the load-related data from the various sensors 38, 40, 42, 44, 46, 48 as the boom 24 is moved across one or more of the distinct measurement regions, the controller 102 may be configured to calculate a region load weight (e.g., an average implement load weight) for each measurement region. The controller 102 may then calculate a final load weight for the implement 22 as the total average of all or a portion of the region load weights calculated for the measurement regions across which the boom 24 was moved. In doing so, as will be described in greater detail below with reference to FIGS. 4-6, the controller 102 may be configured to discard or ignore the load-related data received for any measurement region(s) that the controller 102 determines is likely to be inaccurate or unreliable due to unstable operation of the work vehicle 10. In such instance, the controller 102 may estimate the final load weight for the implement 22 as the total average of only the region load weights determined as a function of the load-related data that the controller 102 deems reliable based on analysis of the stability of the vehicle's operation.

Figure 3:
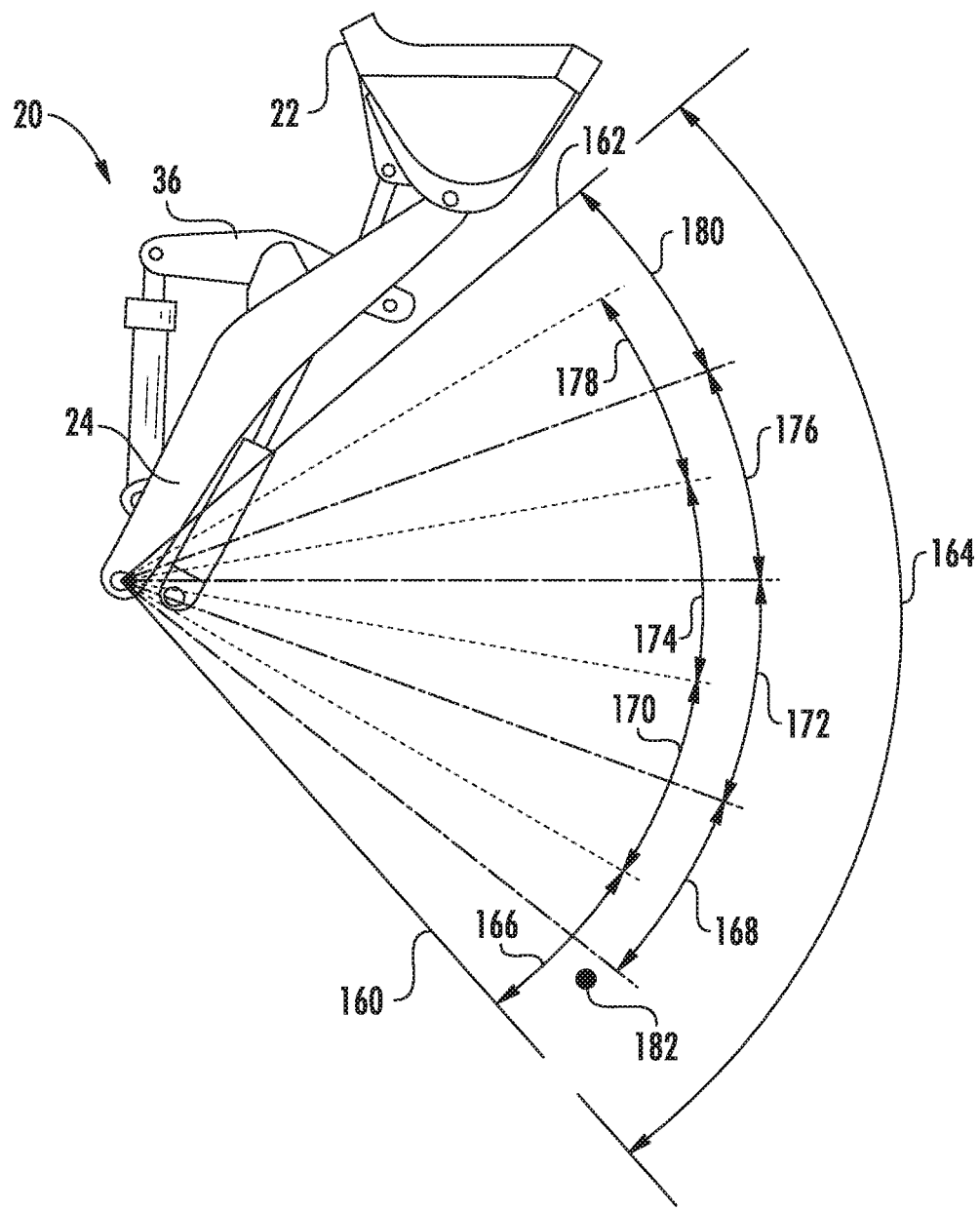
FIG. 3 illustrates a side view of a boom of the work vehicle shown in FIG. 1, particularly illustrating a travel range for the boom divided into a plurality of measurement regions in accordance with aspects of the present subject matter.

One example of the manner in which the travel range of the boom 24 may be divided into a plurality of distinct measurement regions is illustrated in FIG. 3. As shown in FIG. 3, the boom 24 may include a minimum boom position (indicated by line 160) and a maximum boom position (indicated by line 162), with the travel range 164 for the boom 24 being defined between the minimum and maximum boom positions 160, 162. Additionally, as shown in FIG. 3, the travel range 164 is divided into a plurality of distinct measurement regions. For instance, in the illustrated embodiment, the travel range 164 is divided into eight different measurement regions (e.g., a first region 166, a second region 168, a third region 170, a fourth region 172, a fifth region 174, a sixth region 176, a seventh region 178, and an eighth region 180), with adjacent regions 166, 168, 170, 172, 174, 176, 178, 180 being indicated by alternating dashed and phantom lines to distinguish the various regions within the drawing. However, in other embodiments, the travel range 164 may be divided into any other suitable number of measurement regions, including more than eight regions or less than eight regions. Each measurement region may generally span a given sub-range of angular boom positions, such as 5 degrees, 10 degrees, 15 degrees, 20 degrees, 25 degrees, and/or the like, with the specific angular range of the measurement regions generally being determined as a function of the total number of regions and the total span of the travel range 164 of the boom 24.

In several embodiments, the measurement regions 166, 168, 170, 172, 174, 176, 178, 180 may be configured to overlap one another across the travel range 164 of the boom 24. For instance, as shown in the illustrated embodiment, the measurement regions are defined such that the center of each measurement region defines a boundary line(s) for an adjacent measurement region(s). Specifically, as shown in FIG. 3, the first measurement region 166 starts at the minimum boom position 160 and extends upwardly therefrom a predetermined angular range to the center of the second measurement region 168. Similarly, the second measurement region 168 starts at the center of the first measurement region 166 and extends upwardly therefrom the predetermined angular range to the center of third measurement region 170 and so on for the remainder of the measurement regions. Thus, in an embodiment in which each measurement region extends an angular range corresponding to twenty degrees across the travel range 164 of the boom 24, the first measurement region 166 may be defined from zero degrees (i.e., defined at the minimum boom position 160) to twenty degrees, the second measurement region 168 may be defined from ten degrees to thirty degrees, the third measurement region 170 may be defined from twenty degrees to forty degrees, and so on.

It should be appreciated that, in other embodiments, the measurement regions need not be configured to overlap one another from center-to-center as shown in FIG. 3. For instance, in alternative embodiment, each measurement region may be overlapped by two neighboring measurement regions, such as by overlapping the measurement regions at locations defined at 33% and 66% across each region's angular range. In another embodiment, each measurement region may be overlapped by three neighboring measurement regions, such as by overlapping the measurement regions at locations defined at 25%, 50%, and 75% across each region's angular range. In such embodiments, by overlapping the measurement regions across smaller intervals, a greater number of measurement regions may be defined across the booms travel range 164.

As indicated above, to calculate a final load weight for the implement 22, load-related data may be collected from the various sensors 38, 40, 42, 44, 46, 48 as the boom 24 is moved across all or a portion of its travel range 164. For instance, assuming that the boom 24 is moved across its entire travel range 164, a first dataset may be collected from the sensors as the boom 24 is moved across the first measurement region 166. Similarly, a second dataset may be collected from the sensors as the boom 24 is moved across the second measurement region 168, a third dataset may be collected from the sensors as the boom 24 is moved across the third measurement region 170, and so on until the boom 24 reaches the maximum boom position 162. Each dataset may then be analyzed to calculate a region load weight (e.g., an average implement load weight) for its associated measurement region. The various region load weights calculated for the measurement regions (less any measurement regions with load-related data deemed unreliable) may then be averaged to calculate the final load weight for the implement 22.

It should be appreciated that the boom 24 need not be passed through all of the measurement regions 166, 168, 170, 172, 174, 176, 178, 180 to allow a final load weight to be calculated. For instance, when the boom 24 is only passed through a portion of the measurement regions, the region load weights calculated for those measurement regions (less any regions with data deemed unreliable) may be used as the basis for determining the final load weight.

Additionally, it should be appreciated that, by providing overlapping measurement regions, significantly more measurements regions may be defined across the travel range 164 for the boom 24 as opposed to using non-overlapping measurement regions. As such, the controller 102 may be configured to collect data and determine load weight estimates across a larger number of measurement regions, thereby providing the potential for increased accuracy in the final load weight calculated for the implement 22. In addition, the overlapping measurement regions allow for a wider measurement range to be used when movement of the boom 24 is started and/or stopped at a location defined between the minimum and maximum boom positions 160, 162. For instance, if the vertically upward movement of the boom 24 is initiated from point 182 shown in FIG. 3, the controller 102 may begin collecting load-related data for estimating the load weight as the boom 24 enters the second measurement region 168 (e.g., which starts at the center of the first measurement region 166) as opposed to waiting until the end of the first measurement region 166 (e.g., which would be the case for non-overlapping measurement regions). Moreover, the overlapping measurement regions may also allow wider regions to be used without sacrificing the total number of measurement regions. As such, the angular range of each measurement region may be selected to be sufficiently large to ensure that pressure oscillations observed in the measurements from the pressure sensors 44, 46 can be averaged out across each region, thereby improving the accuracy of the region load weights calculated for the measurement regions.

However, it should also be appreciated that aspects of the present subject matter may also be implemented in accordance with disclosure provided herein when the travel range 164 of the boom 24 is divided into non-overlapping measurement regions. For instance, in the embodiment shown in FIG. 3, the travel range 164 may be divided into a plurality of non-overlapping measurement regions between the minimum and maximum boom positions 160, 162, with the measurement regions being defined end-to-end across the travel range 164.

Referring back to FIG. 2, the controller 102 may also be configured to execute a calibration procedure when the disclosed system 100 is used for the first time in association with a work vehicle 10 and/or periodically after extended use (e.g., every six months) to allow adjustments to be made, if necessary, to the predetermined relationships or look-up tables stored within the controller's memory 114 that relate the various monitored operating parameters to the implement load weight. Specifically, in several embodiments, to calibrate the system 100 for providing dynamic measurements of the load weight, the boom 24 may be raised from the minimum boom position 160 to the maximum boom position 162 at a minimum lifting speed, a maximum lifting speed, and an intermediate lifting speed while no load is being carried by the implement 22, with the sensor data being collected as the boom 24 is moved across its travel range 164 at each speed. Such process may then be repeated while the implement 22 is carrying a known load that is at or near the maximum weight load for the implement 22, with the sensor data being collected as the boom 24 is moved across its travel range 164 at the minimum lifting speed, the maximum lifting speed, and the intermediate lifting speed. By collecting such data, a relationship may be defined that correlates the load weight to the boom cylinder force (i.e., the monitored pressure values received from the pressure sensors 44, 46), the velocity of the boom 24, and the position or angle of the boom 24. The relationship may then be used, for example, as an interpolation map for calibrating the system 100 to provide dynamic load measurements.

It should be appreciated that, as an alternative to using a minimum lifting speed, a maximum lifting speed, and an intermediate lifting speed for the calibration procedure, any other suitable combination of lifting speeds may be used, such as simply the minimum lifting speed and the maximum lifting speed. It should also be appreciated that, in one embodiment, the calibration data may be used as a nominal condition for the system 100. In such instance, suitable mathematical models or other stored relationships may be used to compensate for deviations from this nominal condition, such as compensation for difference bucket angles, inclination angles, vehicle accelerations, lift accelerations, and/or the like.

Additionally, it should be appreciated that the controller 102 may also be configured to execute a similar calibration procedure to calibrate the system 100 for providing static measurements of the load weight. For instance, while the implement 22 is carrying no load, the boom 24 may be moved to a minimum weighing position (e.g., a position immediately above the minimum boom position 160) and stopped, then to an intermediate position between the minimum weighing position and the maximum boom position 162 and stopped, and then to the maximum boom position 164 and stopped, with the sensor data being collected at each position while the boom 24 is stopped. Such process may then be repeated while the implement 22 is carrying a known load that is at or near the maximum weight load for the implement 22, with the sensor data being collected at the minimum weighing position, the intermediate position, and the maximum boom position 162 while the boom 24 is stopped. By collecting such data, a relationship may be defined that correlates the load weight to the boom cylinder force (i.e., the monitored pressure values received from the pressure sensors 44, 46) and the position or angle of the boom 24. The relationship may then be used, for example, as an interpolation map for calibrating the system 100 to provide static load measurements.

Moreover, in one embodiment, the controller 102 may be configured to automatically implement the static and/or dynamic calibration procedure(s). Specifically, upon receiving an input from the operator associated with initiating the calibration procedure, the controller 102 may be configured to automatically control the movement of the boom 24 while the load-related data is being collected. Such an automated calibration procedure would allow for improved accuracy and repeatability for the associated calibration measurements.

As indicated above, when the controller 102 is providing dynamic load measurements, the controller 102 may be configured to discard or ignore any load-related data received during an operational period(s) across which the controller 102 determines that the data is likely to be inaccurate or unreliable due to unstable or sufficiently variable operation of the work vehicle 10. Specifically, in several embodiments, as the boom 24 is being moved across its travel range 164 and load-related sensor data is being collected, the controller 102 may be configured to identify instances in which the variation of one or more operator-initiated control commands exceeds a predetermined variance threshold(s) associated with such control command(s) across a given operational period (e.g., a given range of boom movement or a given time period). In such instances, the load-related data captured during such operational period(s) may be discarded or ignored when estimating the implement load weight. As such, the load weight may be calculated based on data collected only when it is determined that the vehicle's operation is relatively stable.

Figure 4:
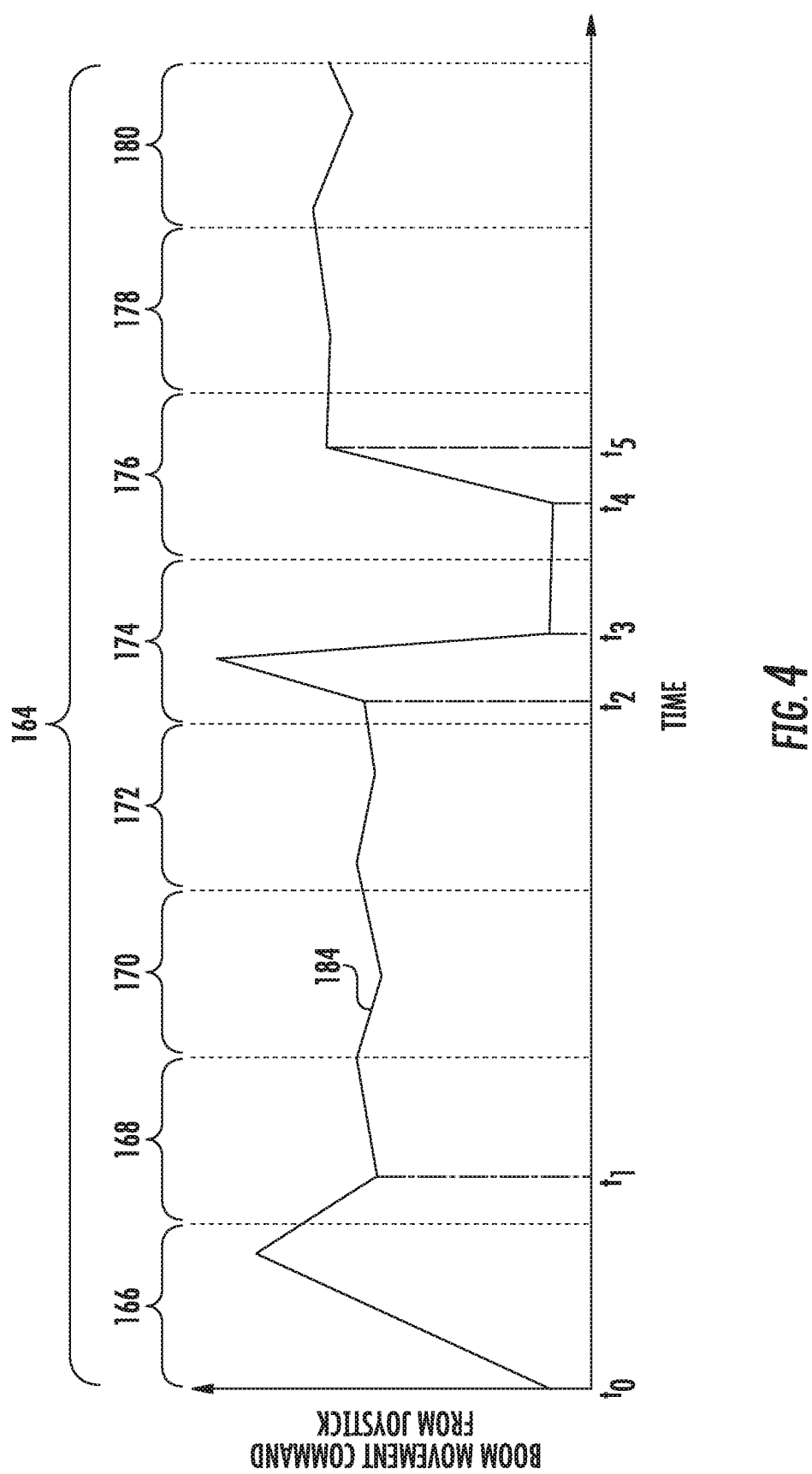
FIG. 4 illustrates an example plot that graphs boom movement commands as function of time as a boom is being moved across its travel range.

For instance, FIG. 4 illustrates a graphical representation of one example of how the operator-initiated boom movement commands (e.g., received via the associated boom joystick or other suitable input device 134) may be varied over time as the boom 24 is moved across its travel range 164. As shown in FIG. 4, the boom's travel range 164 has been divided into the various measurement regions 166, 168, 170, 172, 174, 176, 178, 180 described above with reference to FIG. 3, with each measurement region corresponding to a discrete operational period along which the load-related sensor data is being collected by the controller 102 as the boom 24 is moved along the angular range associated with each region.

As shown, the boom movement command (indicated by line 184) generally varies with time as the boom 24 is moved across the various measurement regions. In several embodiments, the controller 102 may be configured to compare a rate of change of the boom movement command (i.e., the slope of line 184) to a predetermined variance threshold defined for the boom movement command to identify instances in which the variance or rate of change of the boom movement command exceeds the threshold. For each instance in which the variation in the boom command exceeds the predetermined variance threshold, the controller 102 may identify the associated measurement region containing such variable boom operation as an operating period across which the load-related data being received from the sensors may be inaccurate or unreliable. The controller 102 may then discard or ignore the load-related data received within such measurement region(s) when calculating the final load weight for the implement. For instance, as shown in FIG. 4, from time $t_0$ to time $t_1$, from time $t_2$ to time $t_3$, and from time $t_4$ to time $t_5$, the boom movement command is highly variable. In such instance, assuming that the rate of change of the boom movement command exceeds the predetermined variance threshold across such time periods, the controller 102 may be configured to disregard or ignore the load-related data received within the measurement regions associated with the time periods (e.g., the first measurement region 166, the second measurement region 168, the fifth measurement region 174, and the sixth measurement region 176). Rather, to determine the final load weight for the implement 22, the controller 102 may be configured to calculate the region load weight for the remaining measurement regions (e.g., such as an average load weight for the third measurement region 170, the fourth measurement region 172, the seventh measurement region 178, and the eighth measurement region 180) based on the load-related data received within such measurement regions. The controller 102 may then calculate the final load weight by averaging the region load weights determined for the remaining measurement regions 170, 172, 178, 180.

It should be appreciated that, as an alternative to discarding or ignoring the load-related data as a function of the measurement regions containing sufficiently variable boom operation, the load-related data may, instead, be discarded or ignored as function solely of the time periods containing such variable boom operation. For instance, in the example shown in FIG. 4, the controller 102 may be configured to identify the time periods within which the variation or rate of change of the boom movement command exceeds the predetermined variation threshold (e.g., the time period between time $t_0$ and time $t_1$, the time period between time $t_2$ to time $t_3$, and the time period between time $t_4$ to time $t_5$). In such instance, the controller 102 may be configured to discard or ignore the load-related data received during such time periods and, thus, may determine the final load weight based on the load-related data received during the remainder of the time across which the boom 24 was being moved.

Figure 5:
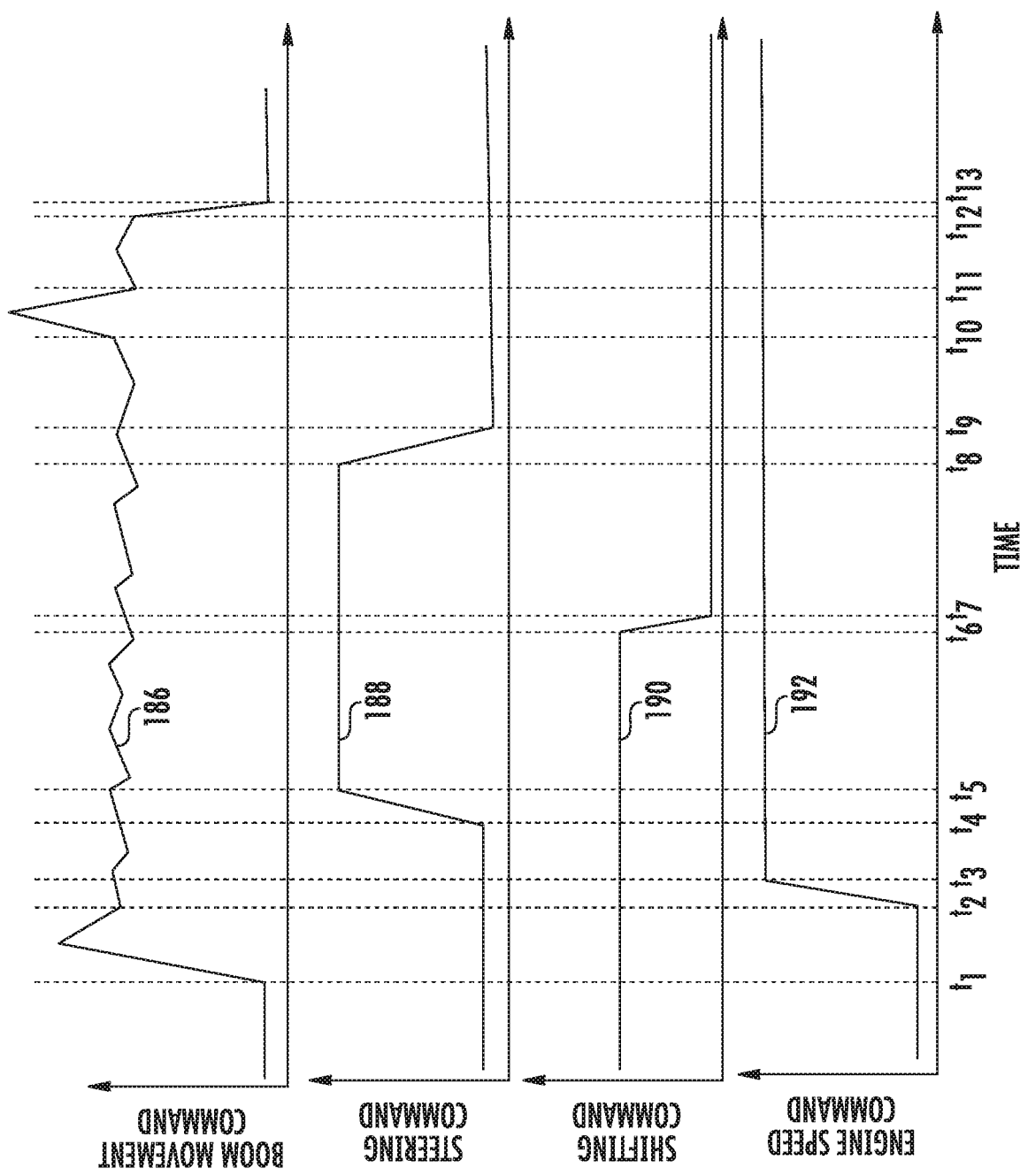
FIG. 5 illustrates an example plot that graphs boom movement commands, steering commands, shifting commands, and engine speed commands over time as a function of time as a boom is being moved across its travel range.

It should also be appreciated that, in addition to the boom movement commands (or as an alternative thereto), the controller 102 may also be configured to take into account any other suitable operator-initiated control commands when determining whether load-related data should be used to calculate the final load weight for the implement 22. For instance, FIG. 5 illustrates a graphical representation of one example of how the operator-initiated boom movement commands (e.g., indicated by line 186), steering commands (e.g., indicated by line 188), transmission shift commands (e.g., indicated by line 190), and engine speed commands (e.g., indicated by line 192) may be varied over time as the boom 24 is moved across its travel range 164. Similar to the embodiment described above, the controller 102 may be configured to compare a rate of change of each operator-initiated command (i.e., the slope of each line 186, 188, 190, 192) to a predetermined variance threshold defined for such operator-initiated command to identify instances in which the variance or rate of change of the command exceeds the threshold. For example, as shown in FIG. 4, from time $t_1$ to time $t_2$, from time $t_{10}$ to time $t_{11}$, and from time $t_{12}$ to time $t_{13}$, the boom movement command 186 is highly variable. Similarly, from time $t_2$ to time $t_3$, the engine speed command 192 is highly variable while from time $t_4$ to time $t_5$ and from time $t_8$ to time $t_9$, the steering command 188 is highly variable. Moreover, from time $t_6$ to time $t_7$, the transmission shift command 190 is highly variable. In such instance, assuming that the rate of change for the relevant operator-initiated command exceeds the corresponding predetermined variance threshold for such command across the associated time periods, the controller 102 may be configured to disregard or ignore the load-related data received within such time periods (or disregard/ignore the load-related data received within measurement regions containing such time periods). The controller 102 may then calculate the final load weight based on the load-related data received when the operator-initiated commands are relatively stable (e.g., within the time falling outside the above-described time periods or within the measurement regions excluding such time periods).

It should be appreciated that, although FIG. 5 illustrates an embodiment in which various operator-initiated control commands are used in combination by the controller 102 to determine whether specific load-related data should be used in calculating the final load weight for the implement 22, each operator-initiated control command may also be used individually by the controller 102 to make such determinations. For instance, similar to the embodiment described above with reference to FIG. 4 in relation to the boom movement commands, any one of the steering commands, the transmission shift commands, the engine speed commands, or any other suitable control commands may be used in isolation as the basis for determining whether load-related data should be used or discarded/ignored. It should also be appreciated that any other suitable operator-initiated control commands may be used by the controller 102 to determine whether specific load-related data should be used in calculating the final load weight for the implement 22, such as the control commands received via the tilt joystick for controlling the movement of the implement 22 (e.g., via control of the operation of the associated tilt cylinder(s) 34).

Figure 6:
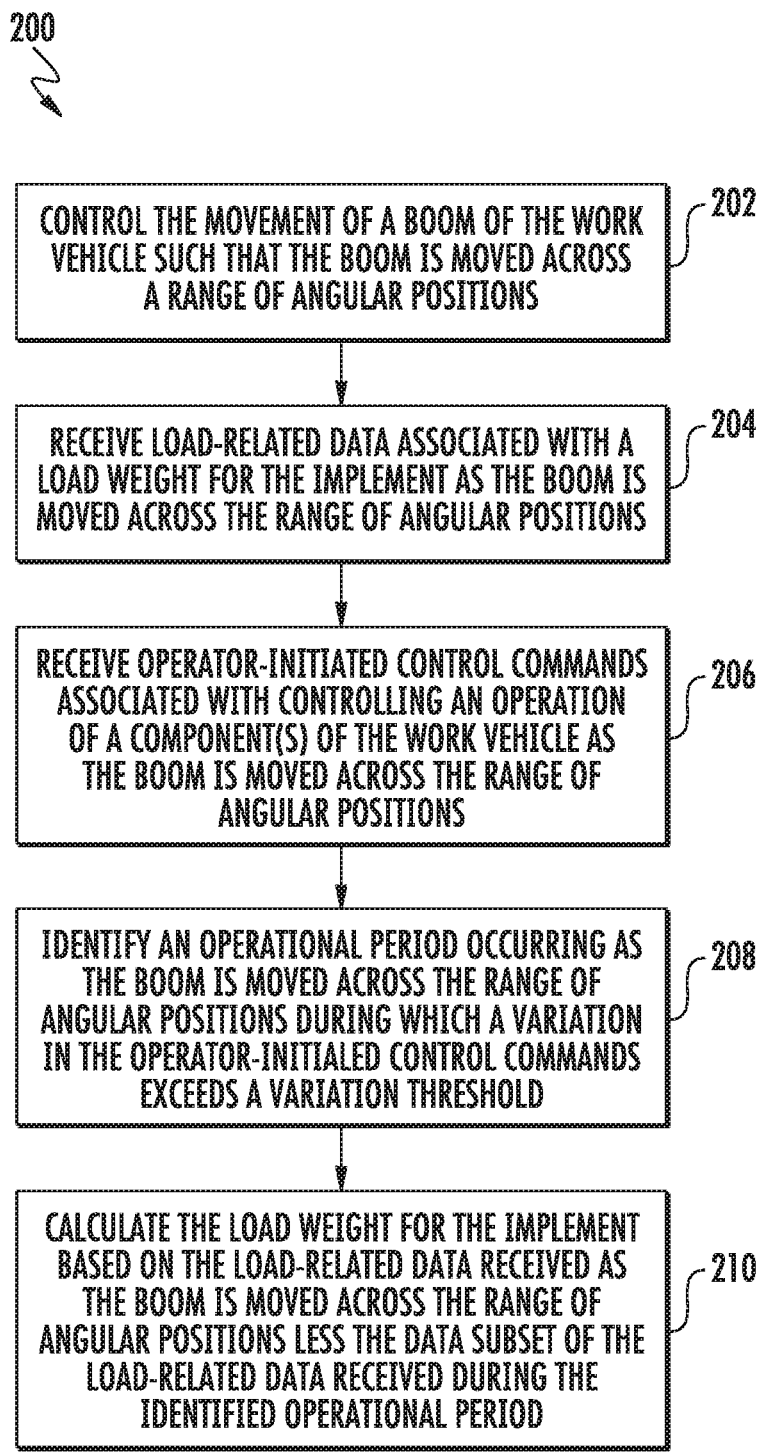
FIG. 6 illustrates a flow diagram of one embodiment of a method for estimating a load weight carried by an implement of a work vehicle in accordance with aspects of the present subject matter.

Referring now to FIG. 6, a flow diagram of one embodiment of a method 200 for estimating load weights for an implement of a work vehicle is illustrated in accordance with aspects of the present subject matter. In general, the method 200 will be described herein with reference to the work vehicle 10 shown in FIG. 1, as well as the various system components shown in FIG. 2. However, it should be appreciated that the disclosed method 200 may be implemented with work vehicles having any other suitable configuration and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include controlling the movement of a boom of the work vehicle such that the boom is moved across a range of angular positions. For instance, as indicated above, the controller 102 may be configured to raise and lower the boom 24 across any suitable range of angular boom positions defined within its travel range 164 by controlling the operation of the associated components of the lift assembly 20, such as by the hydraulic pump(s) 116, the boom control valve(s) 118, and the boom cylinder(s) 32, based on the boom movement commands received from the operator. Alternatively, the controller 102 may be configured to automatically control the operation of the associated components of the lift assembly 20 such that the boom 24 is moved at a controlled rate or speed without the necessity of receiving boom movement commands from the operator.

In addition, at (204), the method 200 may include receiving load-related data associated with a load weight for the implement as the boom is moved across the range of angular positions. For instance, as indicated above, the controller 102 may be configured to receive load-related data associated with the implement load weight from a plurality of sensors, such as one or more pressure sensors 44, 46, position sensors 38, 40, inclination sensors 42, temperature sensors 48, and/or the like. Such data may, for example, include, but is not limited to, pressure measurements related to the fluid pressure of the hydraulic fluid supplied to the boom cylinder(s) 32, position measurements related to the angular position of the boom 24 and/or the implement 22, velocity data for the boom 24 and/or the implement 22, orientation measurements associated with the inclination angle of the work vehicle 10 (e.g., in the pitch direction and/or the roll direction), temperature measurements of the fluid temperature of the hydraulic fluid supplied to the cylinder(s) 32, 34, and/or measurements related to the speed and/or acceleration of the work vehicle 10.

Moreover, at (206), the method 200 may include receiving operator-initiated control commands associated with controlling an operation of at least one component of the work vehicle as the boom is moved across the range of angular positions. Specifically, as indicated above, the controller 102 may be configured to receive one or more operator-initiated control commands from various input devices 134 located within the cab 18. For instance, such operator-initiated control commands may include, but are not limited to, boom movement commands, engine speed commands, steering commands, transmission shifting commands, and/or the like.

Referring still to FIG. 6, at (208), the method 200 may include identifying an operational period occurring as the boom is moved across the range of angular positions during which a variation in the operator-initialed control commands exceeds a variation threshold. For instance, as described above with reference to FIGS. 4 and 5, the controller 102 may be configured to identify instances in which the variation of one or more operator-initiated control commands exceeds a predetermined variance threshold(s) associated with such control command(s) across a given operational period (e.g., across a given range of boom movement or a given time period).

Additionally, at (210), the method may include calculating the load weight for the implement based on the load-related data received as the boom is moved across the range of angular positions less the data subset of the load-related data received during the identified operational period. Specifically, as indicated above, the controller 102 may be configured to discard or ignore the load-related data received during any identified operational periods during which the variation of the operator-initiated control command(s) exceeds the associated variance threshold(s) and, thus, only use the remaining load-related data to calculate or estimate the final load weight for the implement 22.

Figure 7:
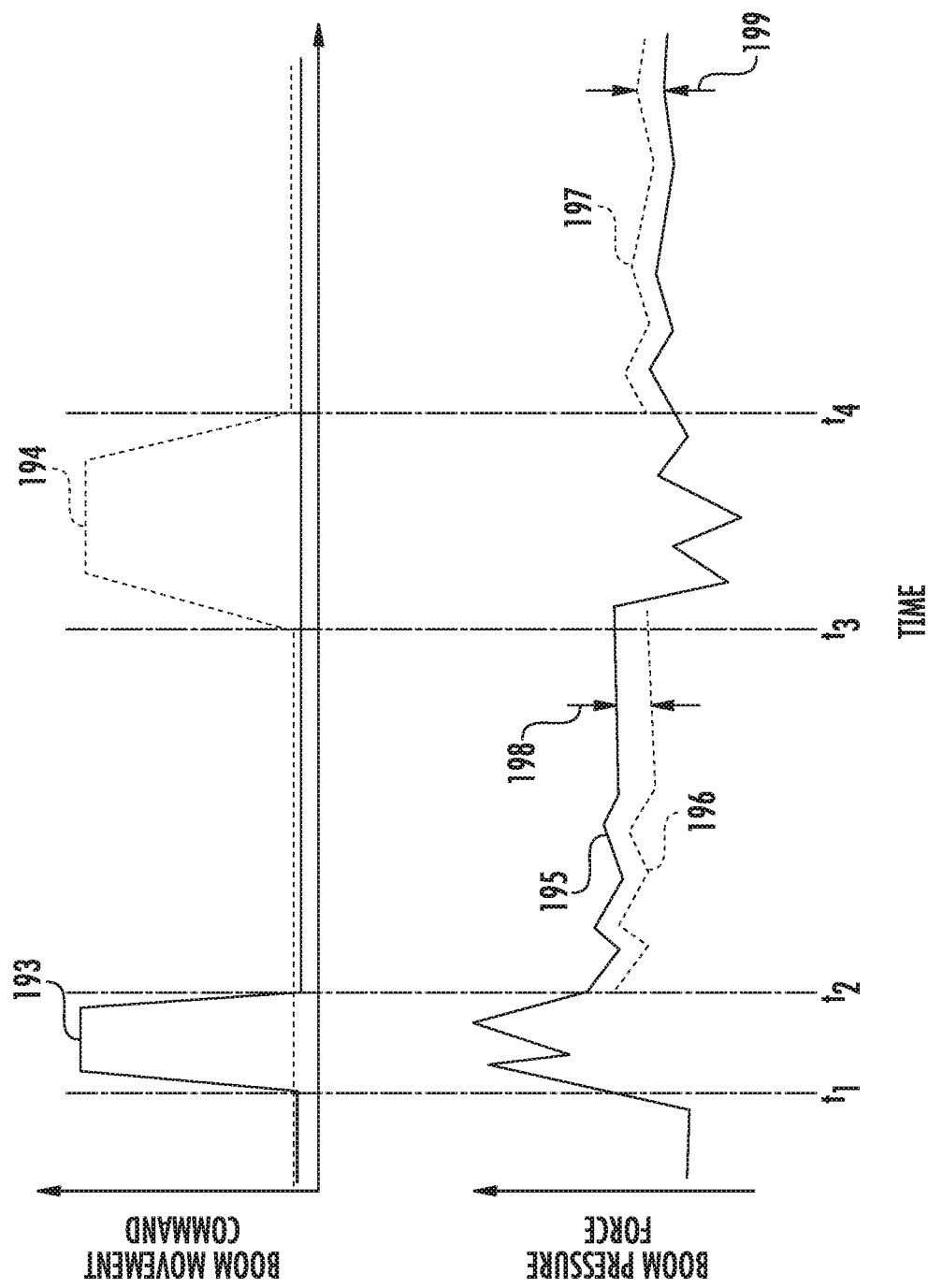
FIG. 7 illustrates an example plot that graphs boom movement commands and boom pressure forces as function of time during periods in which the boom is being moved and when the boom is stationary.
Figure 8:
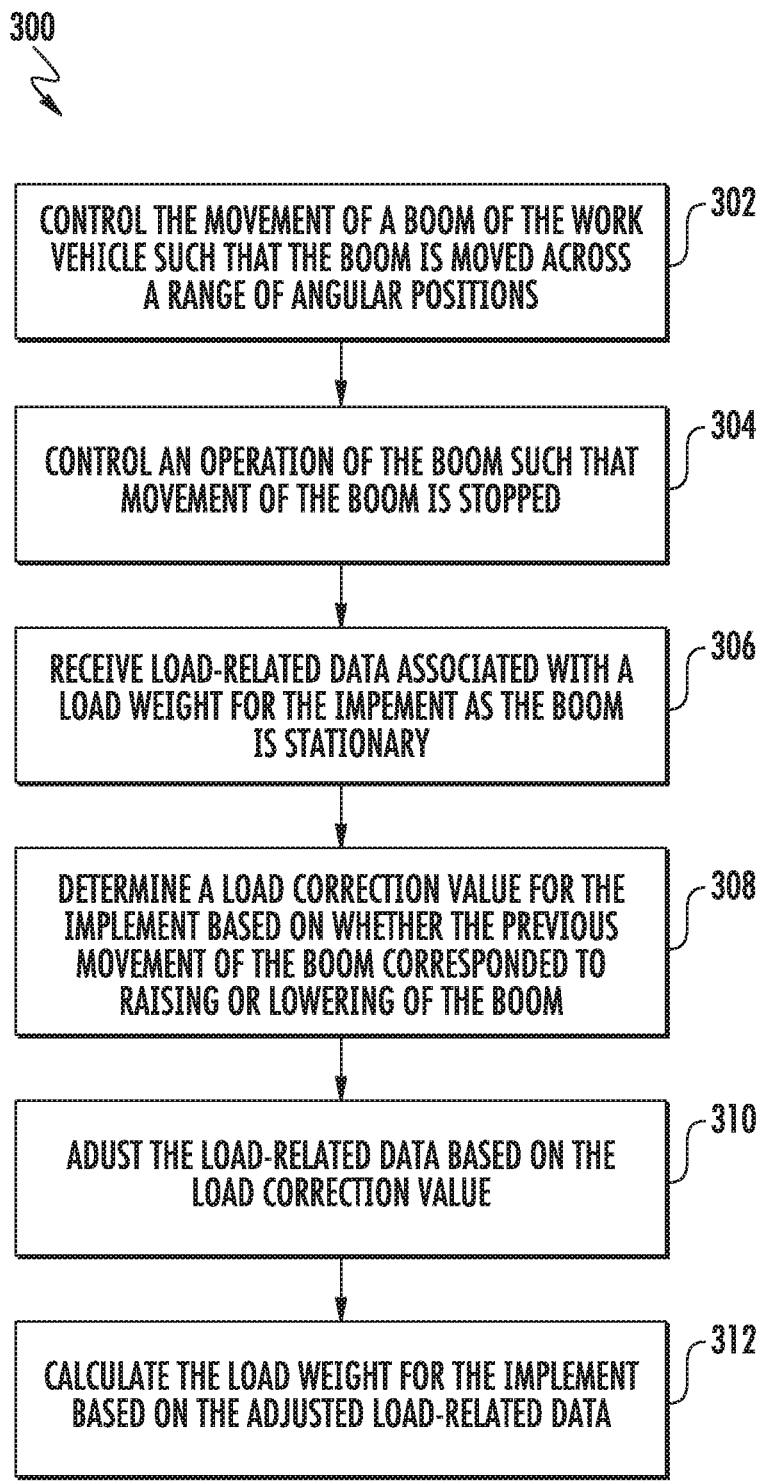
FIG. 8 illustrates a flow diagram of one embodiment of a method for estimating a load weight carried by an implement of a work vehicle in accordance with aspects of the present subject matter.

Referring now to FIGS. 7 and 8, another embodiment of a method for estimating implement load weights will now be described in accordance with aspects of the present subject matter. As indicated above, when the boom 24 is stationary, the controller 102 may be configured to provide "static" load measurements associated with the load weight for the implement 22. In such instances, the prior operator-initiated boom movement command may be used to determine a load correction value for adjusting or correcting at least a portion of the load-related data being used to calculate the implement load weight. Specifically, when the boom 24 is stationary, the static friction that is residual in the boom cylinder(s) 32 will either be providing a positive lifting force or a negative lifting force depending on the direction in which the associated seals of the cylinder(s) 32 were strained for the most recent boom motion. For instance, if the boom 24 was being raised immediately prior to its motion being stopped, the cylinder seals will be strained in a such a way that the seals are pushing the boom cylinder(s) 32 down, which results in a higher hydraulic pressure force being sensed by the pressure sensor(s) 44, 46. In contrast, if the boom 24 was being lowered immediately prior to its motion being stopped, the cylinder seals will be strained in a such a way that the seals are pulling up on the boom cylinder(s) 32, which results in a lower hydraulic pressure force being sensed by the pressure sensor(s) 44, 46. Thus, by determining whether the previous boom movement related to raising or lowering of the boom 24, the monitored or sensed values associated with the pressure of the hydraulic fluid supplied to the boom cylinder(s) 32 may be adjusted up or down using a corresponding load correction value(s) to account for the cylinder friction. In such instance, the load correction value(s) may be determined based on any suitable calibration data, simulation data and/or experimental data that relates the sensed pressure values to the actual boom cylinder pressure values when the boom 24 is stationary immediately after being raised or lowered.

For example, FIG. 7 illustrates a graphical representation of an example in which the monitored pressure values for the boom cylinder(s) 32 has been adjusted to accommodate the hysteresis effect associated with static load measurements. Specifically, FIG. 7 illustrates a plot of both the boom movement commands (i.e., the upper graph) and the associated pressure values for the boom cylinder(s) 32 (i.e., the lower graph) as a function of time. For the plotted boom movement commands, the solid line 193 corresponds to the boom movement command(s) for raising the boom 24 and the dashed line 194 corresponds to the boom movement command(s) for lowering the boom 24. As shown in FIG. 7, between time $t_1$ and time $t_2$, a boom movement command is received for raising the boom 24, and, between time $t_3$ and time $t_4$, a boom movement command is received for lowering the boom 24. However, as shown in the illustrated plot, the boom 24 is maintained stationary within the time period between times $t_2$ and $t_3$ and following time $t_4$.

For the plotted pressure values, the solid line 195 corresponds to the monitored pressure values for the boom cylinder(s) 32 (i.e., pressure measurements provided by the pressure sensor(s) 44, 46). Additionally, the dashed lines 196, 197 indicate the adjusted pressure values for the boom cylinder(s) 32 to account for the static friction within the cylinder(s) 32. Specifically, the stationary period for the boom 24 defined times $t_2$ and $t_3$ immediately follows the boom 24 being raised. As such, the cylinder seals of the boom cylinder(s) 32 are strained in such a way that the seals push the cylinder(s) 32 down, thereby resulting in the monitored pressure values being higher than the actual static pressure force for the boom cylinder(s) 32. Thus, as shown in FIG. 7, a load correction value 198 (e.g., as indicated by the difference between the monitored pressure values 195 and the adjusted pressure values 196 between times $t_2$ and $t_3$) may be applied to reduce the monitored pressure values to values closer to the actual static pressure force for the boom cylinder(s) 32. Similarly, the stationary period for the boom 24 defined after time $t_4$ immediately follows the boom 24 being lowered. As such, the cylinder seals of the boom cylinder(s) 32 are strained in such a way that the seals pull the cylinder(s) 32 up, thereby resulting in the monitored pressure values being lower than the actual static pressure force for the boom cylinder(s) 32. Thus, as shown in FIG. 7, a load correction value 199 (e.g., as indicated by the difference between the monitored pressure values 195 and the adjusted pressure values 197 after time $t_4$) may be applied to increase the monitored pressure values to values closer to the actual static pressure force for the boom cylinder(s) 32.

Referring particularly now to FIG. 8, a flow diagram of another embodiment of a method 300 for estimating load weights for an implement of a work vehicle is illustrated in accordance with aspects of the present subject matter. In general, the method 300 will be described herein with reference to the work vehicle 10 shown in FIG. 1, as well as the various system components shown in FIG. 2. However, it should be appreciated that the disclosed method 30 may be implemented with work vehicles having any other suitable configuration and/or within systems having any other suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (302), the method 300 may include controlling the movement of a boom of the work vehicle such that the boom is moved across a range of angular positions. For instance, as indicated above, the controller 102 may be configured to raise and lower the boom 24 across any suitable range of angular boom positions defined within its travel range 164 by controlling the operation of the associated components of the lift assembly 20, such as by the hydraulic pump(s) 116, the boom control valve(s) 118, and the boom cylinder(s) 32, based on the boom movement commands received from the operator. Alternatively, the controller 102 may be configured to automatically control the operation of the associated components of the lift assembly 20 such that the boom 24 is moved at a controlled rate or speed without the necessity of receiving boom movement commands from the operator.

In addition, at (304), the method 300 may include controlling an operation of the boom such that movement of the boom is stopped. Specifically, by controlling the operation of the associated components of the lift assembly 20, the controller 102 may be configured to stop the movement of the boom 24 based on boom movement commands received from the operator (or the lack thereof).

Moreover, at (306), the method 300 may include receiving load-related data associated with a load weight for the implement as the boom is stationary. For instance, as indicated above, the controller 102 may be configured to receive load-related data associated with the implement load weight from a plurality of sensors, such as one or more pressure sensors 44, 46, position sensors 38, 40, inclination sensors 40, temperature sensors 48, and/or the like. Such data may, for example, include, but is not limited to, pressure measurements related to the fluid pressure of the hydraulic fluid supplied to the boom cylinder(s) 32, position measurements related to the angular position of the boom 24 and/or the implement 22, velocity data for the boom 24 and/or the implement, orientation measurements associated with the inclination angle of the work vehicle 10 (e.g., in the pitch direction and/or the roll direction), temperature measurements of the temperature of the hydraulic fluid supplied to the cylinder(s) 32, 34, and/or measurements related to the speed and/or acceleration of the work vehicle 10.

Referring still to FIG. 8, at (308), the method 300 may include determining a load correction value for the implement based on whether the previous movement of the boom corresponded to raising or lowering of the boom. Specifically, as indicated above, the load correction value may be determined based on the direction in which the static friction within the boom cylinder(s) 32 is acting. For instance, if the boom 24 was previously raised such that the seals of the boom cylinder(s) 32 are pushing the cylinder(s) 32 down, a load correction value may be selected that accounts for the positive lifting force provided by the frictional force (e.g., a negative load correction value). Similarly, if the boom 24 was previously lowered such that the seals of the boom cylinder(s) 32 are pulling the cylinder(s) 32 up, a load correction value may be selected that accounts for the negative lifting force provided by the frictional force (e.g., a positive load correction value).

Additionally, at (310) and (312), the method may include adjusting the load-related data based on the load correction value and calculating the load weight for the implement based on the adjusted load-related data. For example, as indicated above, when the boom 24 was previously raised, the load correction value may be applied to reduce the monitored pressure values for the boom cylinder(s) 32. Alternatively, when the boom 24 was previously lowered, the load correction value may be applied to increase the monitored pressure values for the boom cylinder(s) 32. Regardless, once the monitored pressure values have been adjusted up or down, as appropriate, the adjusted pressure values may then be used by the controller 102 to calculate the load weight for the implement 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for estimating load weights for an implement of a work vehicle, the method comprising:
   controlling, with one or more computing devices, movement of a boom of the work vehicle such that the boom is moved across a range of angular positions, the implement being coupled to the boom;
   receiving, with the one or more computing devices, load-related data associated with a load weight for the implement as the boom is moved across the range of angular positions;
   receiving, with the one or more computing devices, operator-initiated control commands associated with controlling an operation of at least one component of the work vehicle as the boom is moved across the range of angular positions;
   identifying, with the one or more computing devices, an operational period occurring as the boom is moved across the range of angular positions during which changes in the operator-initiated control commands over the operational period exceed a variation threshold associated with the operator-initiated commands, the one or more computing devices receiving a data subset of the load-related data during the operational period; and
   calculating, with the one or more computing devices, the load weight for the implement based on the load-related data received as the boom is moved across the range of angular positions less the data subset of the load-related data received during the operational period.

2. The method of claim 1, wherein the operator-initiated control commands comprise control commands for controlling the operation of a boom cylinder of the work vehicle, the boom cylinder configured to raise and lower the boom.

3. The method of claim 1, wherein the operator-initiated control commands comprise control commands associated with at least one of controlling the operation of a boom cylinder of the work vehicle, adjusting an engine speed of the work vehicle, adjusting a gear ratio of a transmission of the work vehicle, steering the work vehicle, or controlling the operation of a tilt cylinder of the work vehicle.

4. The method of claim 1, wherein the range of angular positions is divided into a plurality of measurement regions, the data subset corresponding to the load-related data received while the boom is moved across a given measurement region of the plurality of measurement regions during which the changes in the operator-initiated control commands exceeds the variation threshold.

5. The method of claim 4, wherein calculating the load weight for the implement comprises:
   calculating a region load weight for each measurement region of the plurality of measurement regions during which the changes in the operator-initiated control commands does not exceed the variation threshold as the boom is moved across such measurement region; and
   determining the load weight based on the calculated region load weights.

6. The method of claim 1, wherein the data subset corresponds to the load-related data received across a time period during which the changes in the operator-initiated control commands exceeds the variation threshold.

7. The method of claim 1, wherein receiving the load-related data comprises receiving sensor data associated with at least one of a pressure of hydraulic fluid supplied to or within a boom cylinder of the work vehicle, a position of the boom, a position of the implement, a velocity of the boom, a velocity of the implement, a temperature of the hydraulic fluid, an inclination angle of the work vehicle, or at least one of speed or acceleration of the work vehicle.

8. The method of claim 1, wherein controlling the movement of the boom of the work vehicle comprises actively controlling an operation of at least one of a hydraulic pump or a control valve of the work vehicle.

9. A method for estimating load weights for an implement of a work vehicle, the method comprising:
   controlling, with one or more computing devices, movement of a boom of the work vehicle such that the boom is moved across a range of angular positions, the implement being coupled to the boom;
   controlling, with the one or more computing devices, an operation of the boom of the work vehicle such that the movement of the boom is stopped;
   receiving, with the one or more computing devices, load-related data associated with a load weight for the implement as the boom is stationary;
   determining, with the one or more computing devices, whether the previous movement of the boom corresponded to raising or lowering of the boom;
   determining, with the one or more computing devices, a load correction value for the implement based on whether the previous movement of the boom corresponded to raising or lowering of the boom, the load correction value differing depending on whether the previous movement of the boom corresponded to raising or lowering of the boom;
   adjusting, with the one or more computing devices, the load-related data based on the load correction value; and
   calculating, with the one or more computing devices, the load weight for the implement based on the adjusted load-related data.

10. The method of claim 9, wherein the load correction value is associated with friction forces within a boom cylinder of the work vehicle, the boom cylinder being configured to raise and lower the boom.

11. The method of claim 10, wherein adjusting the load-related data comprises adjusting pressure data associated with sensed values of a fluid pressure of hydraulic fluid supplied to or within the boom cylinder.

12. The method of claim 11, wherein the load correction value reduces the sensed values when the previous movement of the boom corresponds to raising the boom and wherein the load correction value increases the sensed values when the previous movement of the boom corresponds to lowering the boom.

13. The method of claim 9, wherein receiving the load-related data comprises receiving sensor data associated with at least one of a pressure of hydraulic fluid supplied to or within a boom cylinder of the work vehicle, a position of the boom, a position of the implement, a velocity of the boom, a velocity of the implement, a temperature of the hydraulic fluid, an inclination angle of the work vehicle, or at least one of speed or acceleration of the work vehicle.

14. A system for estimating implement load weights for a work vehicle, the system comprising:
- a lift assembly including a boom and an implement coupled to the boom;
- a controller configured to control the operation of the lift assembly, the controller including a processor and associated memory, the memory storing instructions, that when implemented by the processor, configure the controller to:
  - control movement of the boom such that the boom is moved across a range of angular positions;
  - receive load-related data associated with a load weight for the implement as the boom is moved across the range of angular positions;
  - receive operator-initiated control commands associated with controlling an operation of at least one component of the work vehicle as the boom is moved across the range of angular positions;
  - identify an operational period occurring as the boom is moved across the range of angular positions during which changes in the operator-initiated control commands over the operational period exceed a variation threshold associated with the operator-initiated control commands, the controller receiving a data subset of the load-related data during the operational period; and
  - calculate the load weight for the implement based on the load-related data received as the boom is moved across the range of angular positions less the data subset of the load-related data received during the operational period.

15. The system of claim 14, wherein the operator-initiated control commands comprise control commands for controlling the operation of a boom cylinder of the lift assembly, the boom cylinder configured to raise and lower the boom.

16. The system of claim 14, wherein the operator-initiated control commands comprise control commands associated with at least one of controlling the operation of a boom cylinder of the lift assembly, adjusting an engine speed of the work vehicle, adjusting a gear ratio of a transmission of the work vehicle, steering the work vehicle, or controlling the operation of a tilt cylinder of the work vehicle.

17. The system of claim 14, wherein the range of angular positions is divided into a plurality of measurement regions, the data subset corresponding to the load-related data received while the boom is moved across a given measurement region of the plurality of measurement regions during which the changes in the operator-initiated control commands exceeds the variation threshold.

18. The system of claim 17, wherein the controller is configured to calculate an average load weight for each measurement region of the plurality of measurement regions during which the changes in the operator-initiated control commands does not exceed the variation threshold as the boom is moved across such measurement region, the load weight being determined based on the calculated average load weights.

19. The system of claim 14, wherein the load-related data comprises sensor data associated with at least one of a pressure of hydraulic fluid supplied to or within a boom cylinder of the lift assembly, a position of the boom, a position of the implement, a velocity of the boom, a velocity of the implement, a temperature of the hydraulic fluid, an inclination angle of the work vehicle, or at least one of speed or acceleration of the work vehicle.

20. The system of claim 14, wherein the controller is configured to actively control an operation of at least one of a hydraulic pump or a control valve of the lift assembly to raises or lower the boom.

* * * * *